P. K. STEHMAN.
ELECTRIC TOASTER.
APPLICATION FILED FEB. 3, 1921.

1,416,992.

Patented May 23, 1922.

WITNESS:
Rob't R. Kitchel.

INVENTOR
Paul K. Stehman
BY
Frank S. Busser
ATTORNEY.

UNITED STATES PATENT OFFICE.

PAUL K. STEHMAN, OF ELIZABETHTOWN, PENNSYLVANIA, ASSIGNOR TO EARL M. MILLER, OF ELIZABETHTOWN, PENNSYLVANIA.

ELECTRIC TOASTER.

1,416,992.  Specification of Letters Patent.  Patented May 23, 1922.

Application filed February 3, 1921. Serial No. 442,016.

*To all whom it may concern:*

Be it known that I, PAUL K. STEHMAN, a citizen of the United States, residing at Elizabethtown, county of Lancaster, and State of Pennsylvania, have invented a new and useful Improvement in Electric Toasters, of which the following is a full, clear, and exact description, reference being had to the accompanying drawings, which form a part of this specification.

My invention relates to an improvement in electric toasters.

The object of my invention is to provide a toaster so constructed that bread may be rapidly and uniformly toasted on both sides simultaneously.

Heretofore toasters have been made with the object of toasting bread on both sides simultaneously, but all of such devices, whether adapted to toast the bread in vertical or horizontal position, are defective in that they effect a toasting of the upper portion of the bread more rapidly than the lower portion, with the result that if the lower portion is permitted to toast sufficiently, the upper portion will become overtoasted or burnt. A further disadvantage is that even though the toasting process is carefully watched and the toast removed before the upper portion becomes overdone, the toast is found to be dried out and crumbly.

In accordance with my invention, I provide a toaster which will effect a uniform toasting of the bread throughout and which will toast the bread to the desired degree without drying out or rendering crumbly.

I will now proceed to describe my invention with reference to the accompanying drawings, in which I have illustrated a preferred embodiment thereof, and in which—

Figure 1:
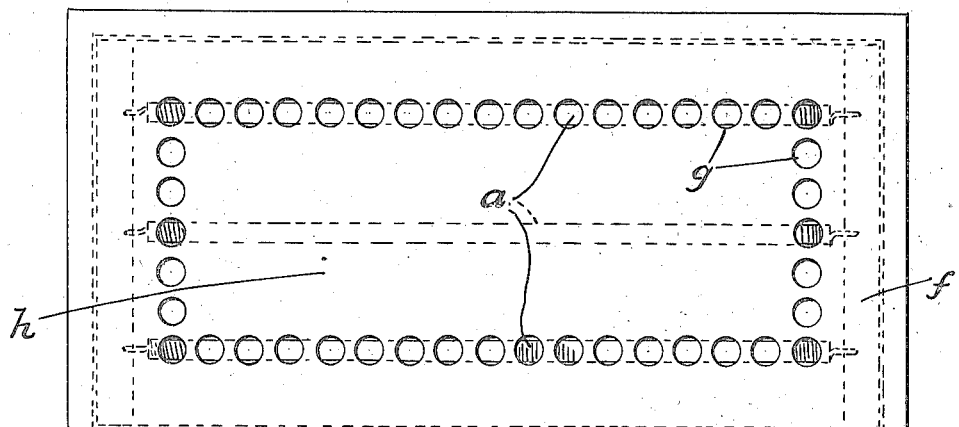
Fig. 1 is a plan view of the top of an electric toaster embodying my invention.
Figure 2:
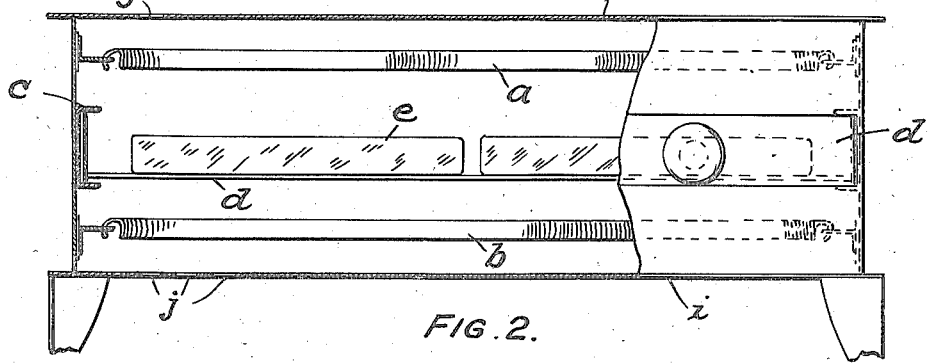
Fig. 2 is a front view of the toaster with the front wall partially cut away.
Figure 3:
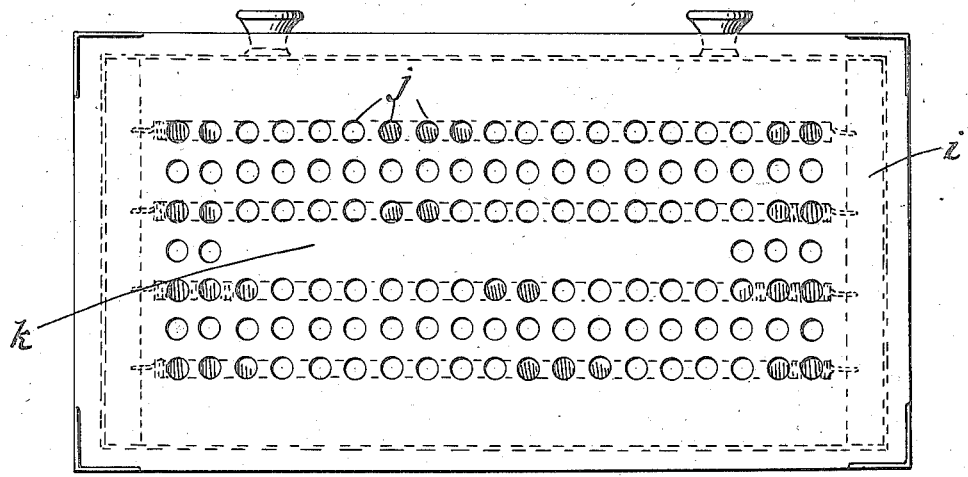
Fig. 3 is a view looking upward at the bottom of the toaster.

The toaster comprises a body or casing within which is supported an upper resistance element $a$ and a lower resistance element $b$, suitably connected to a source of electric current. The resistance elements are spaced one above the other and are unequal in size, the upper element being formed by three resistance wires, as indicated in Figure 1, and the lower being formed by four resistance wires as indicated in Figure 3.

Within the body and secured to the sides, between the resistance elements, are guides $c$ which serve to support a tray $d$ slidably mounted thereon and upon which the bread $e$ to be toasted is placed. The back and end walls of the body are made solid and the front wall is provided with an aperture for the insertion of the tray, the aperture being closed by the front of the tray during the toasting process.

The top $f$ of the body is provided with a series of perforations $g$ about its central portion $h$ which is left solid.

The bottom $i$ is provided with a series of perforations $j$ about its central portion $k$ which is left solid. The area of the perforations in the bottom, in the aggregate, is made greater than the area of the perforations in the top, in the aggregate.

In operation, after the bread to be toasted has been inserted into the toaster and the current turned on, the resistance elements heat up and the air within the toaster is heated. The upper resistance element being smaller than the lower, the greater heat is generated in the lower portion of the body beneath the bread. The tendency of the heated air in the lower part of the toaster is to rise and it does so passing to the upper portion of the toaster and mixing with the air heated by the upper resistance element, in its passage acting on the lower side of the bread to be toasted. The tendency of the heated air in the upper part of the toaster is to escape through the top and it does so to the limited extent permitted by the combined area of the perforations $g$ which is made insufficient to accommodate all the air, with the result that a portion of the hot air is turned back and as the toaster becomes completely heated, such air as passes downwardly acts on the upper side of the bread to toast it and passes out through the perforations $j$ in the bottom, the combined area of which is greater than that of the perforations in the top and sufficient to allow the escape of such hot air and the entry of the required supply of fresh air.

Thus it will be seen that by regulation of the ventilation of the body and proportioning the relative amount of heat in the upper and lower portions, the hot air acting on both the upper and lower faces of the bread will be of substantially the same temperature and both faces will be toasted equally and uniformly; at the same time a sufficient supply of fresh air is provided for so that the bread will not be dried out before the toasting has reached the desired degree.

Having now fully described my invention, what I claim and desire to protect by Letters Patent is:—

1. An electric toaster comprising a body the top and bottom of which are perforated, the aggregate area of the perforations in the bottom being greater than that of the perforations in the top, and a resistance element positioned within the body.

2. An electric toaster comprising a body, the top and bottom of which are perforated, the aggregate area of the perforations in the bottom being greater than that of the perforations in the top, means for the support of a slice of bread within the body, and a resistance element positioned within the body adjacent to the bread supporting means.

3. An electric toaster comprising a body, the top and bottom of which are perforated, the aggregate area of the perforations in the bottom being greater than that of the perforations in the top, and a pair of resistance elements of differential heat generating capacity positioned within the body, in spaced relation to each other, the smaller above the larger.

4. An electric toaster comprising a body, the top and bottom of which are perforated, the aggregate area of the perforations in the bottom being greater than that of the perforations in the top, a pair of resistance elements of differential heat generating capacity positioned within the body, in spaced relation to each other, the smaller above the larger, and means adapted to support a slice of bread between said resistance elements.

5. An electric toaster comprising a body, the top and bottom of which are provided with perforations adjacent substantially imperforate central portions, the aggregate area of the perforations in the bottom being greater than that of the perforations in the top.

6. An electric toaster comprising a body, the top and bottom of which are provided with perforations adjacent substantially imperforate central portions, the aggregate area of the perforations in the bottom being greater than that of the perforations in the top and the area of the imperforate central portion of the top being substantially greater than the area of the imperforate central portion of the bottom.

7. An electric toaster comprising a body, heating elements within the body, the top and bottom of the body being provided with perforations, there being a substantially greater number of perforations in the bottom than in the top and distributed over a substantially greater area.

8. An electric toaster comprising a body, the top and bottom of which are provided with perforations adjacent substantially imperforate central portions, the aggregate area of the perforations in the bottom being greater than that of the perforations in the top, a pair of resistance elements of differential heat generating capacity positioned within the body in spaced relation to each other, the smaller above the larger, and a toasting tray positioned between the pairs of resistance elements.

9. An electric toaster comprising a body, the top and bottom of which are provided with perforations adjacent substantially imperforate central portions, the aggregate area of the perforations in the bottom being greater than that of the perforations in the top and the area of the imperforate central portion of the top being substantially greater than the area of the imperforate central portion of the bottom, a pair of resistance elements of differential heat generating capacity positioned within the body in spaced relation to each other, the smaller above the larger, and a toasting tray positioned between the pairs of resistance elements.

In testimony of which invention, I have hereunto set my hand, at Elizabethtown, Pa., on this 31st day of January, 1921.

PAUL K. STEHMAN.

Witnesses:
S. B. KIEFER,
ALLEN A. COBLE.